US007032442B2

United States Patent
Yanase (10) Patent No.: US 7,032,442 B2
(45) Date of Patent: Apr. 25, 2006

(54) METHOD AND APPARATUS FOR DETECTING DECREASE IN TIRE AIR-PRESSURE AND PROGRAM FOR JUDGING DECOMPRESSION OF TIRE

(75) Inventor: Minao Yanase, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 206 days.

(21) Appl. No.: 10/654,491

(22) Filed: Sep. 4, 2003

(65) Prior Publication Data

US 2004/0046650 A1   Mar. 11, 2004

(30) Foreign Application Priority Data

Sep. 6, 2002   (JP) ...................................... 2002-261647

(51) Int. Cl.
*G01L 17/02*   (2006.01)

(52) U.S. Cl. .......................................... 73/146; 340/442

(58) Field of Classification Search ........... 73/700–756, 73/146–146.8; 340/440–444
See application file for complete search history.

(56) References Cited

U.S. PATENT DOCUMENTS 5,940,781 A   8/1999   Nakajima

FOREIGN PATENT DOCUMENTS

EP   1 203 675 A2   5/2002
JP   10-909   1/1998

*Primary Examiner*—Edward Lefkowitz
*Assistant Examiner*—Jermaine Jenkins
(74) *Attorney, Agent, or Firm*—Birch, Stewart, Kolasch & Birch, LLP (57) ABSTRACT

A method for detecting decrease in tire air-pressure includes the steps of: detecting rotational angular velocities of respective tires; calculating an initial correction coefficient for a ratio of right and left wheels; terminating initialization of a first stage at a point of time when the initial correction coefficient has been calculated for performing a provisional judgment of decompression; calculating an initial correction coefficient for a ratio of front and rear wheels; and terminating initialization of a second stage at a point of time when the initial correction coefficient has been calculated for performing normal judgement of decompression. Detection of decompression when performing running including mostly straight-ahead running such as driving in an urban area might be made at an early stage and at high accuracy to thereby improve the performance of the system.

6 Claims, 3 Drawing Sheets

METHOD AND APPARATUS FOR DETECTING DECREASE IN TIRE AIR-PRESSURE AND PROGRAM FOR JUDGING DECOMPRESSION OF TIRE

This nonprovisional application claims priority under 35 U.S.C. § 119(a) on Patent Application No(s). 2002-261647 filed in JAPAN on Sep. 6, 2002, which is(are) herein incorporated by reference.

BACKGROUND OF THE INVENTION

The present invention relates to a method and apparatus for detecting decrease in tire air-pressure and a program for judging decompression of a tire. More particularly, it relates to a method and apparatus for detecting decrease in tire air-pressure and a program for judging decompression of a tire with which it is possible to detect decompression during initialization at an early stage and at high accuracy.

An apparatus for detecting decrease in tire air-pressure (DWS) in which decompression of a tire is detected on the basis of rotational information of four wheel tires attached to a vehicle is conventionally known. Such an apparatus employs a theory that a rotational angular velocity of a decompressed tire is increased when compared to remaining normal tires owing to a decrease in outer diameter (dynamic load radius of the tire) from that of a tire of normal internal air-pressure. In a method for detecting decrease in internal pressure on the basis of a relative difference in rotational angular velocities of tires (reference should be made to Japanese Unexamined Patent Publication No. 305011/1988), $$DEL=\{(F1+F4)/2-(F2+F3)/2\}/\{(F1+F2+F3+F4)/4\}\times100(\%)$$

is employed as a judged value DEL. Here, F1 to F4 denote rotational angular velocities of a front left tire, a front right tire, a rear left tire and a rear right tire, respectively.

It is judged that decompression of a tire is present when a value which is obtained by calculating the above judged value DEL and performing necessary corrections such as cornering correction and rejections of unnecessary data has exceeded a preliminarily set threshold.

When employing such a method of detection, it is necessary to perform initialization in a condition in which the air-pressure is normal and to learn differences in initial rotational angular velocities for compensating differences in rotational angular velocities due to manufacturing variations or other factors of tires. Presently, approximately 1.5 hours is a minimum required time for initialization. While it is possible that decompression occurs through burst or similar until the initialization is completed, such decompression of a tire during initialization cannot be detected.

It is possible to consider a method in which a threshold that is larger than a normal one is set for enabling detection of decompression of a tire and to accordingly issue alarm also during initialization to some extent.

However, while decompression might be detected also during initialization when the decompression due to a burst happens abruptly and the degree thereof is large, a drawback is presented that initialization might also be completed without issuing an alarm when the decompressing speed is slow.

SUMMARY OF THE INVENTION

In view of the above facts, it is an object of the present invention to provide a method and apparatus for detecting decrease in tire air-pressure and a program for judging decompression of a tire with which it is possible to detect decompression during initialization at an early stage and at high accuracy.

In accordance with a first aspect of the present invention, there is provided a method for detecting decrease in tire air-pressure, which detects decrease in tire air-pressure on the basis of rotational information obtained from tires attached to a four-wheeled vehicle, the method including the steps of: detecting rotational angular velocities of respective tires; calculating an initial correction coefficient for a ratio of right and left wheels from among the rotational angular velocities of respective tires; terminating initialization of a first stage at a point of time when the initial correction coefficient has been calculated for performing a provisional judgment of decompression; calculating an initial correction coefficient for a ratio of front and rear wheels from among the rotational angular velocities of respective tires; and terminating initialization of a second stage at a point of time when the initial correction coefficient has been calculated for performing normal judgment of decompression.

In accordance with a second aspect of the present invention, there is provided a method for detecting decrease in tire air-pressure, which detects decrease in tire air-pressure on the basis of rotational information obtained from tires attached to a four-wheeled vehicle, the method including the steps of: detecting rotational angular velocities of respective tires; calculating an initial correction coefficient for a ratio of front and rear wheels and an initial correction coefficient for a ratio of right and left wheels from among the rotational angular velocities of respective tires; performing provisional judgment of decompression at a point of time when the initial correction coefficient for the ratio of right and left wheels has been calculated; and performing normal judgment of decompression by using the initial correction coefficient for the ratio of right and left wheels and the initial correction coefficient for the ratio of front and rear wheels.

In accordance with a third aspect of the present invention, there is provided an apparatus for detecting decrease in tire air-pressure, which detects decrease in tire air-pressure on the basis of rotational information obtained from tires attached to a four-wheeled vehicle, the apparatus including: rotational information detecting means which detect rotational angular velocities of respective tires; a first calculating means which calculates an initial correction coefficient for a ratio of right and left wheels from among the rotational angular velocities of respective tires; a provisional decompression judging means which terminates initialization of a first stage at a point of time when the initial correction coefficient has been calculated for performing a provisional judgment of decompression; a second calculating means which calculates an initial correction coefficient for a ratio of front and rear wheels from among the rotational angular velocities of respective tires; and a normal decompression judging means which terminates initialization of a second stage at a point of time when the initial correction coefficient has been calculated for performing normal judgment of decompression.

In accordance with a fourth aspect of the present invention, there is provided an apparatus for detecting decrease in tire air-pressure, which detects decrease in tire air-pressure on the basis of rotational information obtained from tires attached to a four-wheeled vehicle, the apparatus including: rotational information detecting means which detect rotational angular velocities of respective tires; a calculating means which calculates an initial correction coefficient for a ratio of front and rear wheels and an initial correction coefficient for a ratio of right and left wheels from among the rotational angular velocities of respective tires; a provisional decompression judging means which performs provisional judgment of decompression at a point of time when the initial correction coefficient for the ratio of right and left wheels has been calculated; and a normal decompression judging means which performs normal judgment of decompression by using the initial correction coefficient for the ratio of right and left wheels and the initial correction coefficient for the ratio of front and rear wheels.

In accordance with a fifth aspect of the present invention, there is provided a program for judging decompression of a tire in which for judging decrease in tire air-pressure, a computer is made to function as a first calculating means which calculates an initial correction coefficient for a ratio of right and left wheels from among the rotational angular velocities of respective tires; a provisional decompression judging means which terminates initialization of a first stage at a point of time when the initial correction coefficient has been calculated for performing a provisional judgment of decompression; a second calculating means which calculates an initial correction coefficient for a ratio of front and rear wheels from among the rotational angular velocities of respective tires; and a normal decompression judging means which terminates initialization of a second stage at a point of time when the initial correction coefficient has been calculated for performing normal judgment of decompression.

In accordance with a sixth aspect of the present invention, there is provided a program for judging decompression of a tire in which for judging decrease in tire air-pressure, a computer is made to function as a calculating means which calculates an initial correction coefficient for a ratio of front and rear wheels and an initial correction coefficient for a ratio of right and left wheels from among rotational angular velocities of respective tires; a provisional decompression judging means which performs provisional judgment of decompression at a point of time when the initial correction coefficient for the ratio of right and left wheels has been calculated; and normal decompression judging means which performs normal judgment of decompression by using the initial correction coefficient for the ratio of right and left wheels and the initial correction coefficient for the ratio of front and rear wheels.

DETAILED DESCRIPTION

The method and apparatus for detecting decrease in tire air-pressure and the program for judging decompression of a tire according to the present invention will now be explained on the basis of the accompanying drawings.

Embodiment 1

Figure 1:
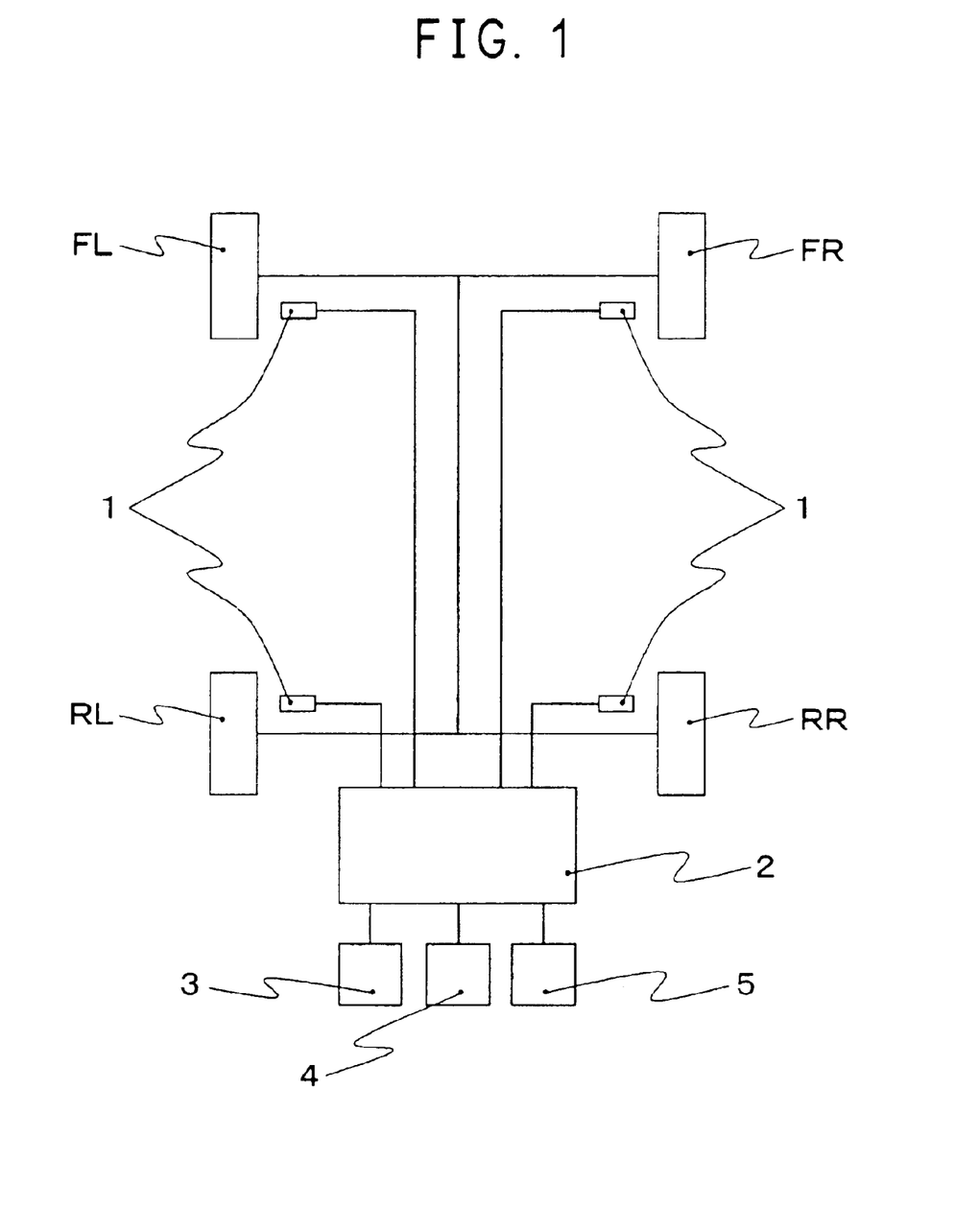
FIG. 1 is a block view illustrating one embodiment of the apparatus for detecting decrease in tire air-pressure according to the present invention.

As shown in FIG. 1, the apparatus for detecting decrease in tire air-pressure according to the present embodiment is for detecting whether air-pressure of any of four tires FL, FR, RL and RR (hereinafter generally referred to as Wi, wherein i=1 to 4, 1: front left tire, 2: front right tire, 3: rear left tire, 4: rear right tire) attached to a four-wheeled vehicle is decreased or not, and includes ordinary rotational information detecting means 1 respectively provided for each of the tires Wi.

The rotational information detecting means 1 might be a wheel speed sensor for measuring rotational angular velocities which represent rotational information on the basis of number of pulses upon generating rotational pulses by using an electromagnetic pickup or similar, or an angular velocity sensor in which power is generated by using rotation such as in a dynamo, wherein the rotational angular velocity is measured from a voltage thereof. Outputs of the rotational information detecting means 1 are supplied to a control unit 2 which might be a computer such as an ABS.

A display 3 comprising liquid crystal display elements, plasma display elements or CRT for informing a tire Wi of which the tire air-pressure has decreased, an initialization switch 4 which might be operated by a driver and an alarm 5 are connected to the control unit 2.

Figure 2:
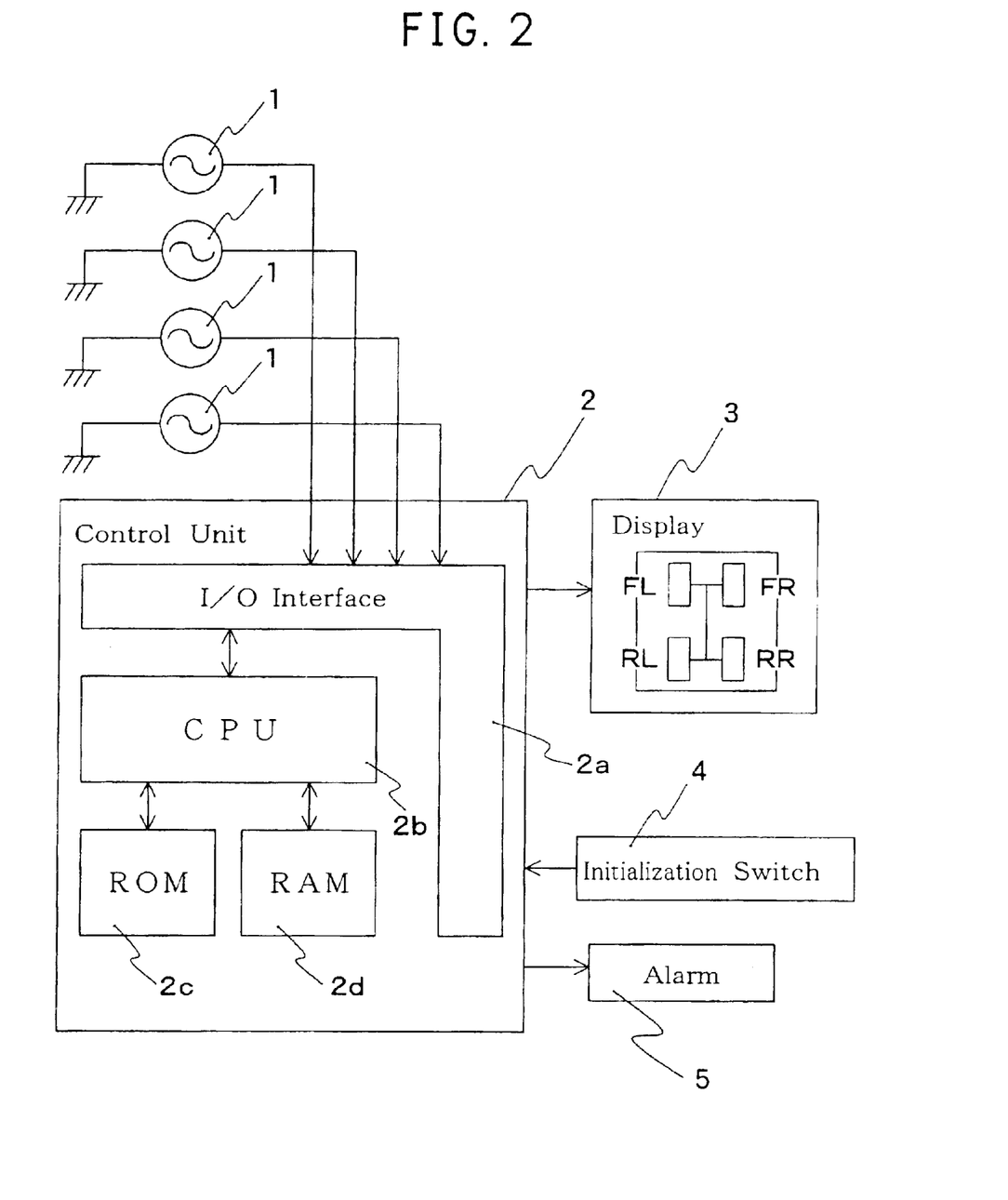
FIG. 2 is a block view illustrating electric arrangements of the apparatus for detecting decrease in tire air-pressure of FIG. 1.

As shown in FIG. 2, the control unit 2 comprises an I/O interface $2a$ required for sending/receiving signals to/from an external device, a CPU $2b$ which functions as a center of calculation, a ROM $2c$ which stores a control operation program for the CPU $2b$, and a RAM $2d$ into which data are temporally written and are read out therefrom when the CPU $2b$ performs control operations. In the following explanations, it is supposed that the object vehicle is a FF (front engine-front drive) vehicle.

Pulse signals corresponding to the rotational number of tires Wi (hereinafter referred to as "wheel speed pulse") are output from the rotational information detecting means 1. In the CPU $2b$, rotational angular velocities $F_i$ for the respective tires Wi are calculated on the basis of the wheel speed pulses as output from the rotational information detecting means 1 at specified sampling periods $\Delta T$(sec), for instance, $\Delta T=1$.

Since the tires Wi are manufactured to include variations (initial differences) within standards, effective rolling radii of the respective tires Wi (a value obtained by dividing a distance that has been traveled by a single rotation by $2\pi$) are not necessarily identical even though all of the tires Wi are at normal internal pressure. This will result in variations in the rotational angular velocities $F_i$ of the respective tires Wi. Thus, corrected rotational angular velocities $F1_i$ are calculated to cancel variations owing to initial differences. More particularly, corrections are performed to satisfy $$F1_1 = F1 \tag{1}$$

$$F1_2 = K1 \times F2 \tag{2}$$

$$F1_3 = K3 \times F3 \tag{3}$$

$$F1_4 = K2 \times K3 \times F4 \tag{4}$$

The initial correction coefficients K1 and K2 are obtained from the right and left wheel ratio as K1=F1/F2 (initial correction coefficient for correcting a difference in effective rolling radii owing to initial differences between right and left tires in the front FL, FR) and K2=F3/F4 (initial correction coefficient for correcting a difference in effective rolling radii owing to initial differences between right and left tires in the rear RL, RR) on the basis of rotational angular velocities Fi when the rotational angular velocities Fi have been calculated on the premise that the vehicle is performing straight-ahead driving. The initial correction coefficient K3 is obtained from the front and rear wheel ratio as K3=(F1+F2)/(F3+F4)(initial correction coefficient for correcting a difference in effective rolling radii owing to initial differences between right and left tires in the front FL, FR and right and left tires in the rear RL, RR), since it is possible to consider that the respective rotational angular velocities of the driving tires are not affected through slip when the vehicle is performing neutral running (non-activated running) in which neither driving torque nor braking torque is acting on the vehicle.

A judged value DEL for detecting decrease in air-pressure of tire Wi is obtained by comparing differences between two of, for instance, the front wheel tires and the rear wheel tires, wherein a sum of signals of one pair of wheels located on one diagonal line is subtracted from a sum of signals of the other pair of wheels located on the other diagonal line, and a ratio of this obtained value to an average value of the two sums is obtained.

$$DEL = \{(F1_1 + F1_4)/2 - (F1_2 + F1_3)/2\} / \{(F1_1 + F1_2 + F1_3 + F1_4)/4\} \times 100(\%) \quad (5)$$

In general, when performing initialization of an apparatus for detecting decrease in tire air-pressure, the initial correction coefficients $K1$, $K2$ are obtained on the basis of two right and left wheel ratios when the vehicle is performing straight-ahead running, while the initial correction coefficient $K3$ is obtained from one front and rear wheel ratio when the vehicle is in a non-activated condition. The initial correction coefficients $K1$, $K2$ are for setting the judged value DEL when the air-pressure is normal to zero and for accurately calculating turning radii or lateral accelerations from wheel speeds. On the other hand, while the initial correction coefficient $K3$ is not required for setting the judged value DEL to zero, but it is required for calculating a slip rate required when performing cornering correction of the judged value DEL. Since data obtained during non-activated conditions are required for the initial correction coefficient $K3$, data can only be collected under limited conditions, so that it will take some time for obtaining them.

Figure 3:
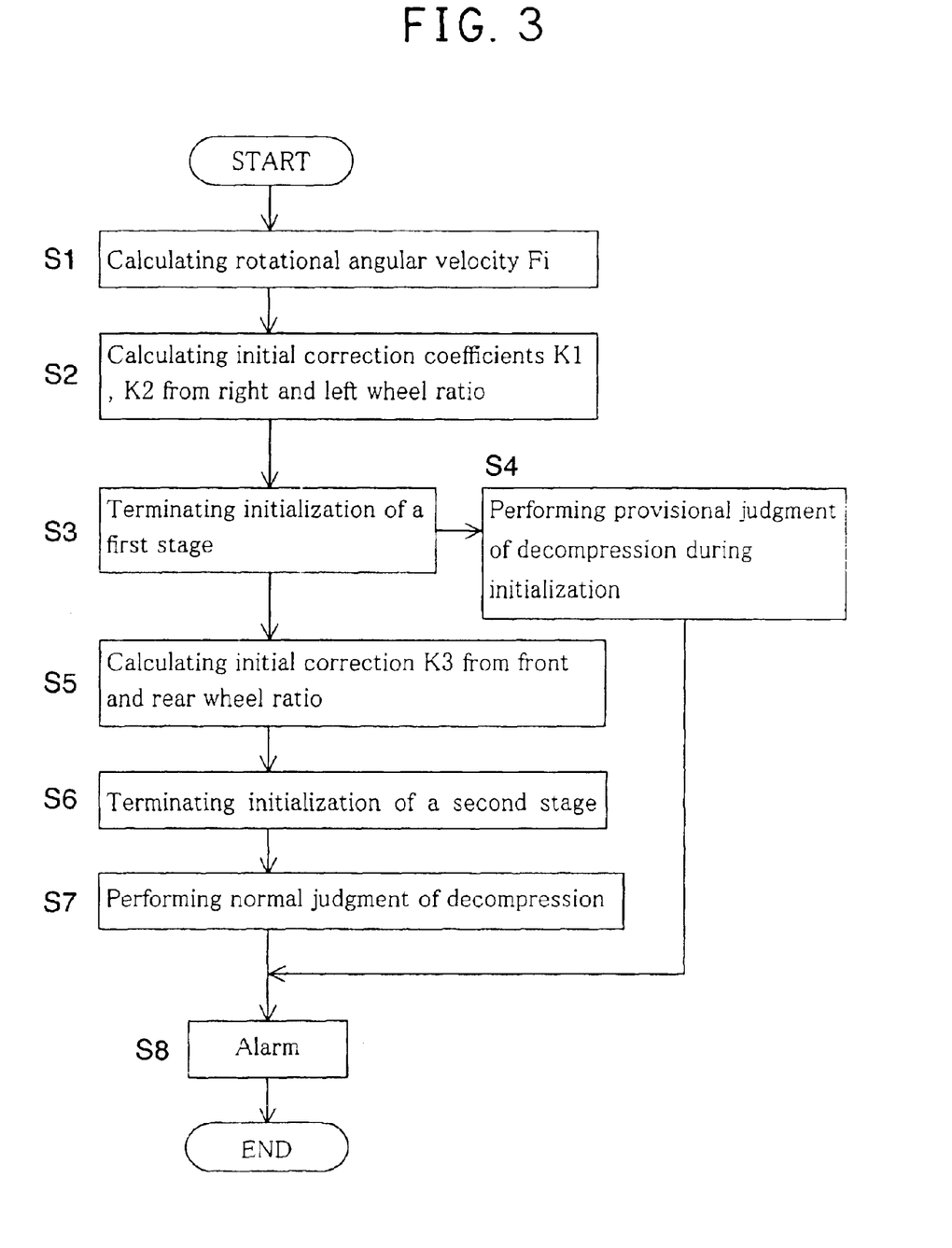
FIG. 3 is one example of a flow chart according to the present invention.

The present embodiment is accordingly so arranged, as shown in FIG. 3, that the rotational angular velocity Fi is calculated whereupon the initial correction coefficients $K1$, $K2$ are calculated from the right and left wheel ratio from among factors obtained during initialization (Steps S1, S2). At a point of time when the initial correction coefficients $K1$, $K2$ have been obtained, initialization of a first stage is terminated for performing a provisional judgment of decompression (Steps S3, S4). With this arrangement, detection of decompression might be performed in a straight-ahead running condition, and if the judged value DEL exceeds a specified threshold, it is determined that decompression is present for issuing alarm (Step S8). Calculation of the initial correction coefficient $K3$ is then performed on the basis of the front and rear wheel ratio (Step S5). At a point of time when initial correction coefficient $K3$ has been obtained, initialization of a second stage is terminated (Step S6). With this arrangement, it will be possible to judge decompression during turning movements in addition to the straight-ahead driving condition.

Normal judgment of decompression is then performed by using the initial correction coefficients $K1$, $K2$ and $K3$ (Step S7). If the judged value DEL exceeds a specified threshold, it is judged that decompression is present and alarm is accordingly issued (Step S8).

In this manner, when detecting decompression on the basis of initial correction coefficients $K1$, $K2$ which might be obtained through running for a relatively short period of time (approximately 10 to 15 minutes) (while detection might only be performed during straight-ahead running since no turning corrections can be performed in the absence of the initial correction coefficient $K3$), it is possible to shorten the time in which the system of the apparatus for detecting decompression of air-pressure is not in operation. Since the initial correction coefficients $K1$, $K2$ which are obtained for the provisional judgment of decompression are also used for normal judgment of decompression, the threshold used for provisional judgment of decompression can be identical to the threshold which is used for normal judgment of decompression. Accordingly, by the provision of two-staged initialization processes, it is possible to detect decompression during initialization at an early stage and at high accuracy.

The present embodiment comprises rotational information detecting means 1 which detect rotational angular velocities of respective tires; a first calculating means which calculates an initial correction coefficient for a ratio of right and left wheels from among the rotational angular velocities of respective tires; a provisional decompression judging means which terminates initialization of a first stage at a point of time when the initial correction coefficient has been calculated for performing provisional judgment of decompression; a second calculating means which calculates an initial correction coefficient for a ratio of front and rear wheels from among the rotational angular velocities of respective tires; and a normal decompression judging means which terminates initialization of a second stage at a point of time when the initial correction coefficient has been calculated for performing normal judgment of decompression.

The present embodiment is further so arranged that the control unit 2 is made to function as the first calculating means which calculates an initial correction coefficient for a ratio of right and left wheels from among the rotational angular velocities of respective tires; the provisional decompression judging means which terminates initialization of a first stage at a point of time when the initial correction coefficient has been calculated for performing provisional judgment of decompression; the second calculating means which calculates an initial correction coefficient for a ratio of front and rear wheels from among the rotational angular velocities of respective tires; and the normal decompression judging means which terminates initialization of a second stage at a point of time when the initial correction coefficient has been calculated for performing normal judgment of decompression.

It should be noted that the rotational angular velocities Fi might include errors depending on magnitude of velocities of the vehicle (hereinafter referred to as "vehicle velocities"), the front and rear directional accelerations of the respective tires Wi, turning radii of the vehicle or the lateral directional accelerations of the vehicle, and errors are similarly included when the footbrake is being actuated. It is accordingly preferable that processes are performed for judging whether rotational angular velocities Fi are to be rejected on the basis of the fact whether possibilities that errors are included in the calculated rotational angular velocities Fi are high or not so as to improve the accuracy of judgment.

More particularly, when the vehicle velocity is extremely low, the detection accuracy of the rotational information detecting means 1 will be remarkably deteriorated so that possibilities that errors are contained in the calculated rotational angular velocities Fi are high. Where the front and rear directional accelerations of the respective tires Wi are relatively high or where the footbrake is being actuated, influences of slip of tires Wi owing to abrupt acceleration or abrupt deceleration are highly possible so that possibilities that errors are contained in the calculated rotational angular velocities Fi are high. Further, where the turning radius of the vehicle is relatively small or the lateral directional acceleration of the vehicle is relatively large, tires Wi are apt to laterally slip so that possibilities that errors are contained in the calculated rotational angular velocities Fi are high.

In this manner, where possibilities that errors are contained in the calculated rotational angular velocities Fi are high, it is preferable not to employ but to reject such rotational angular velocities Fi for detecting decrease in air-pressure.

One example of operations of the apparatus for detecting decrease in tire air-pressure according to the present embodiment will now be explained along processes (1) to (9).

(1) The rotational angular velocities Fi of the respective tires Wi are calculated on the basis of the wheel speed pulses as output from the rotational information detecting means 1.

(2) Then, the vehicle velocity V is calculated on the basis of the wheel speeds Vi of the respective tires Wi. The wheel speeds Vi of the respective tires Wi are calculated in accordance with the following equation (6). Here, r denotes a constant corresponding to the effective rolling radius at the time of performing straight-ahead running and is stored in the ROM 2c.

$$Vi = r \times Fi \tag{6}$$

The vehicle velocity V is calculated from the following equation (7) on the basis of the calculated wheel speeds Vi of the respective tires Wi.

$$V = (V1 + V2 + V3 + V4)/4 \tag{7}$$

(3) Then, the front and rear directional accelerations FRAi of the respective tires Wi are calculated from the following equation (8) provided that the wheel speeds of the respective tires Wi calculated in the previous sampling period are BVi.

$$FRAi = (Vi - BVi)/(\Delta T \times 9.8) \tag{8}$$

The CPU 2b then judges whether the rotational angular velocities Fi calculated in the present sampling period ΔT are to be rejected on the basis of the calculated vehicle velocity V and the front and rear directional accelerations FRAi of the respective tires Wi. More particularly, if either of the following two conditions <1> to <2> is satisfied, the rotational angular velocities Fi are rejected.

<1> V<Vth (for instance, Vth=10(km/h))

<2> MAX{|FRAi|}>Ath (for instance, Ath=0.1 G)

(4) When the rotational angular velocity Fi is not to be rejected, the CPU 2b proceeds with further initializing processes; however, rotational angular velocities Fi which vary owing to factors other than initial differences not only vary through factors such as the above vehicle velocity V and the front and rear directional accelerations FRAi of the respective tires Wi but also owing to lateral directional acceleration acting on the vehicle when the vehicle is performing cornering. Accordingly, when the vehicle is performing cornering, it is necessary to reject rotational angular velocities Fi detected in the present sampling period ΔT.

The CPU 2b accordingly judges whether the vehicle is performing straight-ahead running. More particularly, lateral directional acceleration LA of the vehicle is calculated from the following equation (9) on the basis of the vehicle velocity V and a turning radius Rr of the vehicle.

$$LA = V^2/(Rr \times 9.8) \tag{9}$$

(5) It is then judged whether the calculated lateral directional acceleration LA of the vehicle falls within a preliminarily determined allowable range ΔG or not. When the lateral directional acceleration LA of the vehicle does not fall within the allowable range ΔG, it is possible to consider that the vehicle is not performing straight-ahead running so that the initialization processes are once terminated. When the lateral directional acceleration LA of the vehicle falls within the allowable range ΔG, it is possible to consider that the vehicle is performing straight-ahead running so that calculation of the initial correction coefficients K1, K2 is started.

Note that the reason why calculation of the initial correction coefficient K3 is not started here is that the initial correction coefficient K3 is obtained on the basis of a rotational angular velocity ratio between front and rear tires unlike the initial correction coefficients K1, K2. More particularly, even when the vehicle is performing straight-ahead running, driving tires are apt to slip when driving or braking the vehicle wherein influences of such slip will also affect the rotational angular velocity ratio of the front and rear tires.

(6) Then, the CPU 2b adds the rotational angular velocities F1, F2 of the right and left tires in the front FL, FR detected in the present sampling period ΔT to cumulative additional values BF1, BF2 obtained in previous initializing processes and stored in a buffer of the control unit 2 as indicated by the following equations (10) and (11) for obtaining new cumulative additional values BF1, BF2. Similarly, the rotational angular velocities F3, F4 of the right and left tire in the rear RL, RR are added to cumulative additional values BF3, BF4 obtained in previous initializing processes and stored in another buffer of the control unit 2 as indicated by the following equations (12) and (14) for obtaining new cumulative additional values BF3, BF4.

$$BF1 = BF1 + F1 \tag{10}$$

$$BF2 = BF2 + F2 \tag{11}$$

$$BF3 = BF3 + F3 \tag{12}$$

$$BF4 = BF4 + F4 \tag{13}$$

The initial correction coefficients K1, K2 are then obtained from the following equations (14) and (15) on the basis of the obtained cumulative additional values BF1, BF2 and BF3, BF4. The initial correction coefficients K1, K2 are stored in a non-volatile memory (EEPROM).

$$K1 = BF1/BF2 \tag{14}$$

$$K2 = BF3/BF4 \tag{15}$$

(7) At a point of time when the initial correction coefficients K1, K2 are obtained through step (6), initialization of the first stage is terminated. The initial correction coefficients K1, K2 are used for performing provisional judgment of decompression during initialization.

More particularly, corrected wheel speeds $Vr_1$, $Vr_2$, $Vr_3$, and $Vr_4$ are expressed as $$V1_1 = Vr_1{'}$$

$$V1_2 = K1 \times Vr_2{'}$$

$$V1_3 = Vr_3{'}$$

$$V1_4 = K2 \times Vr_4{'}$$

when using the initial correction coefficients K1, K2, with the wheel speeds prior to correction being $Vr_1{'}$, $Vr_2{'}$, $Vr_3{'}$, and $Vr_4{'}$.

Thereafter, possible rejection is performed on the basis of accelerations/decelerations, turning radii or lateral directional acceleration. It should be noted that the turning radii Rr and lateral directional accelerations LG are respectively calculated from equations (23) and (24) explained later. The lateral directional accelerations LG are especially obtained upon performing strict rejections such as $-0.05$ G$<$LG$<+$ $0.05$ G for eliminating data during turning movements. The judged value DEL is calculated by using the above equation (5) for determining that decompression is present when the judged value DEL has exceeded the threshold.

(8) The initialization processes are further proceeded, and the CPU $2b$ judges whether the vehicle is performing non-activated running or not for obtaining the initial correction coefficient K3. More particularly, the front and rear directional acceleration FRA of the vehicle is obtained from the following equation (16) on the basis of the front and rear directional accelerations FRAi of the respective tires Wi, and it is judged whether the obtained the front and rear directional acceleration FRA falls within a preliminarily determined neutral range $\Delta A$ (for instance, $\Delta A = -0.01$ to $-0.05$) or not.

$$FRA = (FRA1 + FRA2 + FRA3 + FRA4) \quad (16)$$

When the vehicle is not performing non-activated running, it is possible to consider that slip influences onto the respective rotational angular velocities F1, F2 of the driving tires FL, FR so that initialization processes are once terminated. On the other hand, when the vehicle is performing non-activated running, it is possible to consider that the respective rotational angular velocities F1, F2 of the driving tires FL, FR are not affected through slip so that calculation of the initial correction coefficient K3 is started.

More particularly, the CPU $2b$ adds a sum (F1+F2) of respective rotational angular velocities F1, F2 of the right and left tires in the front FL, FR to a cumulative additional value BFf obtained in previous initializing processes and stored in a buffer as indicated by the following equation (17) for obtaining a new cumulative additional value BFf. Similarly, the sum (F3+F4) of respective rotational angular velocities F3, F4 of the right and left tire in the rear RL, RR is added to a cumulative additional value BFb stored in a buffer as indicated by the following equation (18) for obtaining a new cumulative additional value BFb.

$$BFf = BFf + (F1 + F2) \quad (17)$$

$$BFb = BFb + (F3 + F4) \quad (18)$$

Then, a ratio between the respective cumulative additional values BFf and BFb is obtained as indicated by the following equation (19). In this manner, the initial correction coefficient K3 is obtained.

$$K3 = BFf/BFb \quad (19)$$

It should be noted that it is possible to employ an arrangement in which a count value of an initialization counter for recording a number of calculations for the initial correction coefficients K1 to K3 is incremented by 1; and in which it is judged whether the counter value has reached an upper limit value, and thereafter when the counter value has actually reached the upper limit value, it is possible to determine that final initial correction values K1 to K3 have been obtained. The initial correction coefficients K1 to K3 are stored in a non-volatile memory (EEPROM $2e$) for keeping the initial correction coefficients K1 to K3 also after ignition switch is switched off.

(9) Normal judgment of decompression is then performed.

The rotational angular velocities Fi are corrected in accordance with the above equations (1) to (4) by using the initial correction coefficients K1 to K3 obtained in the initialization processes in accordance with the above steps for obtaining new rotational angular velocities $F1_i$.

When the velocity of the vehicle is extremely low, when the front and rear directional accelerations of the respective tires Wi are relatively large, when the turning radius of the vehicle is relatively small, and when the lateral directional acceleration of the vehicle is relatively large, errors are included in the rotational angular velocities $F1_i$. In such cases, the rotational angular velocities $F1_i$ do not truly represent the air-pressure of the respective tires Wi so that they need to be rejected without being used for judging decompression of air-pressure.

The CPU $2b$ calculates wheel speeds Vri of the respective tires Wi on the basis of the corrected rotational angular velocities $F1_i$ and using the following equation (20) so as to calculate the vehicle velocity Vr from the following equation (21) on the basis of the calculated wheel speeds Vri.

$$Vri = r \times F1_i \quad (20)$$

$$Vr = (F1^1 + F1^2 + F1^3 + F1^4)/4 \quad (21)$$

The CPU $2b$ calculates the front and rear directional accelerations FRAri of the respective tires Wi from the following equation (22) on the basis of the vehicle velocity Vr and the vehicle velocity BVri calculated in the previous sampling period $\Delta T$.

$$FRAri = (Vri - BVri)/(\Delta T \times 9.8) \quad (22)$$

The CPU $2b$ further calculates the turning radius Rr of the vehicle from the following equation (23) on the basis of the vehicle velocity Vr. In equation (23), Tw denotes a tread width (distance between right and left wheels).

$$Rr = (Tw/2) \times (Vr4 + Vr3)/(Vr4 - Vr3) \quad (23)$$

The CPU $2b$ then calculates the lateral directional acceleration of the vehicle LAr from the following equation (24) on the basis of the vehicle velocity Vr.

$$LAr = Vr^2/(Rr \times 9.8) \quad (24)$$

The CPU $2b$ judges whether the rotational angular velocities $F1_i$ calculated in the present sampling period $\Delta T$ are to be rejected or not on the basis of the calculated velocity of the vehicle Vr, the front and rear directional accelerations FRAri of the respective tires Wi, the turning radius Rr of the vehicle and the lateral directional acceleration LAr of the vehicle. More particularly, if any one of the following four conditions <1> to <4> is satisfied, the rotational angular velocities $F1_i$ are rejected.

<1> Vr<Vth
<2> MAX{|FRAri|}>Ath
<3> |Rr|<Rth (for instance, Rth=30(m))
<4> |LAr|>Gth (for instance, Gth=0.4(g))

When the rotational angular velocities $F1_i$ are not to be rejected, the judged value DEL is calculated in accordance with the above equation (5) on the basis of the rotational angular velocities $F1_i$.

On the basis of the calculated judged value DEL, it is judged whether a tire Wi of decreased air-pressure is present or not. In other words, it is judged whether the judged value DEL satisfies the following equation (25). Note that in the following equation (25), Dth1=Dth2=0.1 is satisfied.

$DEL < -Dth1$ or $DEL > Dth2$ (25)

When the judged value DEL satisfies this equation, it is judged that an air-pressure of any one tire is decreased so as to issue alarm accordingly. Where the judged value DEL does not satisfy this equation, it is judged that the air-pressure of tires Wi are all of normal internal pressure, and the decompression judging processes are terminated.

Embodiment 2

While the initial correction coefficient K3 has been calculated after calculating the initial correction coefficients K1, K2 in the above embodiment, the present invention is not to be limited to such an arrangement, and the initial correction coefficient K3 might be calculated also in the course of obtaining the initial correction coefficients K1, K2 as long as data matching certain conditions can be gained for the purpose of shortening the time until judgment of decompression can be made. Accordingly, conventional initialization and initialization for obtaining only initial correction coefficients K1, K2 might also be performed in parallel during running.

Accordingly, the present embodiment might comprise the rotational information detecting means 1; a calculating means which calculates an initial correction coefficient for a ratio of front and rear wheels and an initial correction coefficient for a ratio of right and left wheels from among the rotational angular velocities of respective tires; a provisional decompression judging means which performs provisional judgment of decompression at a point of time when the initial correction coefficient for the ratio of right and left wheels has been calculated; and a normal decompression judging means which performs normal judgment of decompression by using the initial correction coefficient for the ratio of right and left wheels and the initial correction coefficient for the ratio of front and rear wheels. The control unit 2 is made to function as the calculating means which calculates an initial correction coefficient for a ratio of front and rear wheels and an initial correction coefficient for a ratio of right and left wheels from among the rotational angular velocities of respective tires; the provisional decompression judging means which performs provisional judgment of decompression at a point of time when the initial correction coefficient for the ratio of right and left wheels has been calculated; and the normal decompression judging means which performs normal judgment of decompression by using the initial correction coefficient for the ratio of right and left wheels and the initial correction coefficient for the ratio of front and rear wheels.

As explained so far, according to the present invention, judgment of decompression might be made in a straight-ahead running condition by using the provisional decompression judgment, so that detection of decompression when performing running including mostly straight-ahead running such as driving in an urban area might be made at an early stage and at high accuracy to thereby improve the performance of the system.

What is claimed is:

1. A method for detecting decrease in tire air-pressure, which detects decrease in tire air-pressure on the basis of rotational information obtained from tires attached to a four-wheeled vehicle, the method comprising the steps of: detecting rotational angular velocities of respective tires; calculating an initial correction coefficient for a ratio of right and left wheels from among the rotational angular velocities of respective tires; terminating initialization of a first stage at a point of time when the initial correction coefficient has been calculated for performing a provisional judgment of decompression; calculating an initial correction coefficient for a ratio of front and rear wheels from among the rotational angular velocities of respective tires; and terminating initialization of a second stage at a point of time when the initial correction coefficient has been calculated for performing normal judgment of decompression.

2. A method for detecting decrease in tire air-pressure, which detects decrease in tire air-pressure on the basis of rotational information obtained from tires attached to a four-wheeled vehicle, the method comprising the steps of: detecting rotational angular velocities of respective tires; calculating an initial correction coefficient for a ratio of front and rear wheels and an initial correction coefficient for a ratio of right and left wheels from among the rotational angular velocities of respective tires; performing provisional judgment of decompression at a point of time when the initial correction coefficient for the ratio of right and left wheels has been calculated; and performing normal judgment of decompression by using the initial correction coefficient for the ratio of right and left wheels and the initial correction coefficient for the ratio of front and rear wheels.

3. An apparatus for detecting decrease in tire air-pressure, which detects decrease in tire air-pressure on the basis of rotational information obtained from tires attached to a four-wheeled vehicle, the apparatus comprising: rotational information detecting means which detect rotational angular velocities of respective tires; a first calculating means which calculates an initial correction coefficient for a ratio of right and left wheels from among the rotational angular velocities of respective tires; a provisional decompression judging means which terminates completes initialization of a first stage at a point of time when the initial correction coefficient has been calculated for performing a provisional judgment of decompression; a second calculating means which calculates an initial correction coefficient for a ratio of front and rear wheels from among the rotational angular velocities of respective tires; and a normal decompression judging means which terminates completes initialization of a second stage at a point of time when the initial correction coefficient has been calculated for performing normal judgment of decompression.

4. An apparatus for detecting decrease in tire air-pressure, which detects decrease in tire air-pressure on the basis of rotational information obtained from tires attached to a four-wheeled vehicle, the apparatus including comprising: rotational information detecting means which detect rotational angular velocities of respective tires; a calculating means which calculates an initial correction coefficient for a ratio of front and rear wheels and an initial correction coefficient for a ratio of right and left wheels from among the rotational angular velocities of respective tires; a provisional decompression judging means which performs provisional judgment of decompression at a point of time when the initial correction coefficient for the ratio of right and left wheels has been calculated; and a normal decompression judging means which performs normal judgment of decompression by using the initial correction coefficient for the ratio of right and left wheels and the initial correction coefficient for the ratio of front and rear wheels.

5. A program embodied in a computer readable medium for judging decompression of a tire in which for judging decrease in tire air-pressure, a computer is made to function as a first calculating means which calculates an initial correction coefficient for a ratio of right and left wheels from among the rotational angular velocities of respective tires; a provisional decompression judging means which terminates initialization of a first stage at a point of time when the initial correction coefficient has been calculated for performing a provisional judgment of decompression; a second calculating means which calculates an initial correction coefficient for a ratio of front and rear wheels from among the rotational angular velocities of respective tires; and a normal decompression judging means which terminates initialization of a second stage at a point of time when the initial correction coefficient has been calculated for performing normal judgment of decompression.

6. A program embodied in a computer readable medium for judging decompression of a tire in which for judging decrease in tire air-pressure, a computer is made to function as a calculating means which calculates an initial correction coefficient for a ratio of front and rear wheels and an initial correction coefficient for a ratio of right and left wheels from among rotational angular velocities of respective tires; a provisional decompression judging means which performs provisional judgment of decompression at a point of time when the initial correction coefficient for the ratio of right and left wheels has been calculated; and normal decompression judging means which performs normal judgment of decompression by using the initial correction coefficient for the ratio of right and left wheels and the initial correction coefficient for the ratio of front and rear wheels.

* * * * *